July 22, 1969
R. M. JANSSON ET AL
3,456,708
DRYING OF POWDER
Filed Dec. 2, 1965
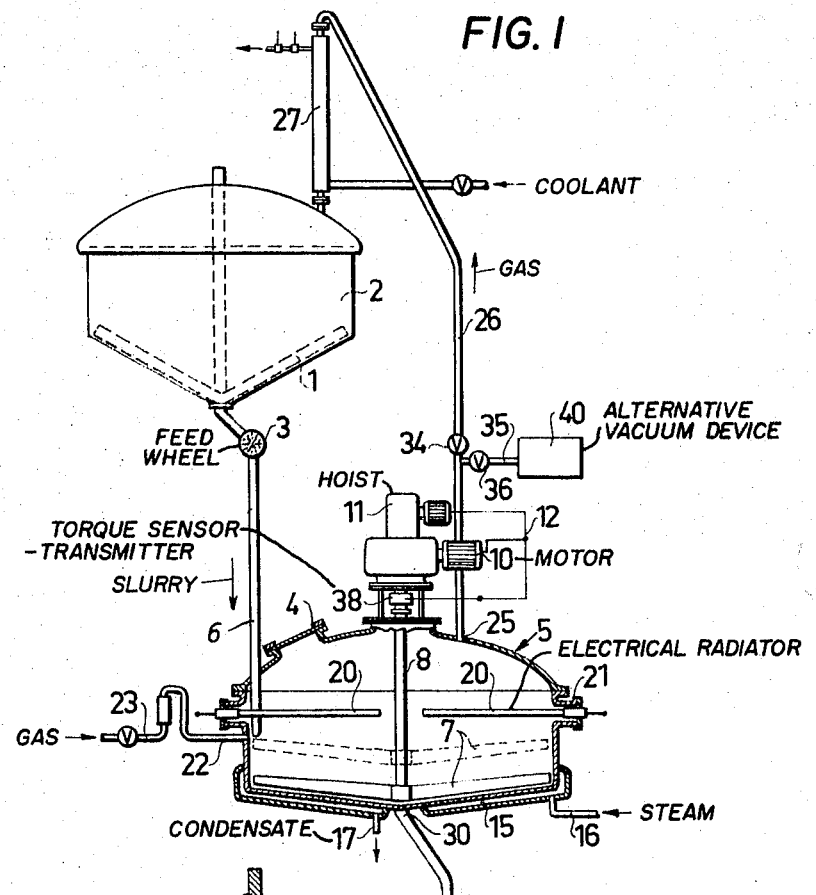
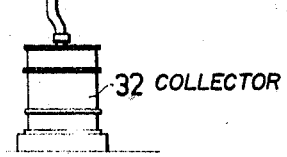
INVENTORS
Robert Mauritz Jansson
Erik Axel Strandell
Claes Gustaf Wik
BY Pierce, Scheffler & Parker
ATTORNEYS

United States Patent Office 3,456,708
Patented July 22, 1969

3,456,708
DRYING OF POWDER
Robert Mauritz Jansson, Hagersten, Erik Axel Strandell, Lidingo, and Claes Gustaf Wik, Vallingby, Sweden, assignors to Aktiebolaget Atomenergi, Stockholm, Sweden, a company of Sweden
Filed Dec. 2, 1965, Ser. No. 511,082
Claims priority, application Sweden, Dec. 7, 1964, 14,794/64
Int. Cl. B01d *1/30, 1/02*
U.S. Cl. 159—42                                                    11 Claims

ABSTRACT OF THE DISCLOSURE

A temperature-sensitive or fragile particulate material associated with an evaporatable liquid is dried in a drying pan the bottom of which is substantially horizontal (not more than a 45° slope) by forming a cake of the moist material on the bottom of the pan, heating the cake from above, scraping the upper surface of the cake to loosen superficial particles by means of a rotating scraper, and gradually lowering the scraper carefully towards the bottom of the pan as particles in the cake surface progressively become loose and form a bulk of free-flowing particles dried by reason of loss of their associated liquid through the heat transmitted from above and by the intermediation of the bulk of particles stirred by the rotating scraper.

---

This invention relates to a method and a device for drying, that is evaporation of water or another liquid, from a fine grained particulate material, such as powder and particularly material that is heat sensitive and/or the particles of which are porous or in any other way easily damaged by mechanical strain. Such material may consist of small crystals or crystallites, aggregated to more or less round porous particles. Material of this kind is in many cases obtained when substances are precipitated from solutions, resulting in a slurry. An example of this is the precipitation of uranium compounds, for instance sodium uranate from sodium uranyl carbonate and ammonium uranate by the so-called homogeneous precipitation method.

It is desired to be able to convert such a material, as a precipitate of porous particles into a dry, preferably free flowing powder, in which the individual particles are substantially unchanged in regard to size and structure, that is still porous. This is of importance for a following agglomeration, such as making pellets, tablets or compressed bodies, for instance, preparatory to sintering as is the case in making cuts for fuel elements for nuclear reactors out of the mentioned uranium compounds. The invention is also of importance in drying of powder, sensitive to temperature, e.g. medicine. A special object of the invention is to make it possible to perform the drying with the material in the form of a thick layer.

It is true that the drying could be performed by spreading out the material on drying trays or in similar manual ways, but the invention is intended to provide an industrial method, which is economical, hygienic, rapid and requires a comparatively small space, and which can be performed without dusting, so that losses of dust can be avoided and the working room can be kept clean and neat and so that possibly toxic substances are not allowed to come out into this room. In case that the particle material is available in the form of a more or less diluted suspension and it is desired to thicken this by evaporation, the invention has for an object such a performance of the method that the evaporation can be achieved in an economical and practical manner in connection with the drying and in such a way that splashing is prevented.

The objects of the invention are, at first hand, realized by supplying heat from above to a mass of the material, moist from water or another liquid, for instance containing 70–80% dry substance, in a drying pan or another container (with a substantially plain or slightly conical bottom at an angle to horizontal of not more than 45° and preferably not more than 30°) and successively or intermittently scraping off the upper layer of the moist mass with a scraping device, for instance a rotating scraper, working from above and downwards through the mass preferably with such a speed that the scraping member substantially moves only in the gas space above the mass or in easily flowing powder, or the like, made free or loosened from the moist mass. In the mass of loosened powder, the particles move vertically by the stirring, and particles, which have been dried and heated at the top of the mass bring heat to deeper layers and to the moist mass. It is presumed that the moist mass in the drying device is already at this point in a comparatively thick consistence like a pulp or paste, such as, for instance, a precipitate can have after sedimentation, filtration or centrifugation. In that form, however, it is often difficult practically to transport the material to the container.

Therefore, it may be suitable to start with a suspension of the precipitate or, quite generally, the particulated material, which can then be transported through pipe lines, possibly by pumping.

When drying particulate material in the form of a suspension containing, for instance, 50–60% of dry substance, it is suitable, in accordance with the invention, that the suspension is brought to the drying pan or container and is evaporated (concentrated) through heat brought from below through the bottom of the container and/or from above from heating units and with stirring with a scraper, paddle agitator or similar agitator, until the stirring resistance rapidly or strikingly is increased and a mass with for instance 70–80% dry substance is obtained. At this moment the agitator, possibly automatically at an impulse from a torque indicator, is elevated and the evaporated mass is dried in the way mentioned above. The evaporation, which is suitably effected by boiling, is not carried on further than stirring can easily be continued and the stirring should be done in such a way that sedimentation on the bottom of the container is prevented. In this way splash is also prevented. Under these circumstances the suspension behaves substantially as a liquid, for instance a water solution, and the stirring resistance is practically independent of the concentration of the suspended material, until during the evaporation a given concentration is reached, when a change in consistency sets in compartively suddenly. The evaporation step is then interrupted and the drying step begins with scraping from the surface. The scraping device is also suitably used as agitator, but these members may be separate. The evaporation and/or the drying may be carried out in vacuum, whereby, among other things, material, sensitive to temperature, is handled with caution.

It is suitable that the agitating member is operated with its lower edge close to the bottom of the container, preferably in such a way that substantially the whole bottom is swept over and relieved of any sediment that may deposit. It has appeared that the particles of the material to a large extent are deformed or compressed if the lower edge of the agitator is rounded. This also refers to the scraper member to some extent. For that reason and in order to increase the effect of the members, the front of the lower edge in the direction of motion ought to be sharp and shaped like a cutting edge.

The lowering of the scraper member through the moist mass must be done with caution so that the resistance against its movement is kept below a given value for each kind of particles. Otherwise, the particles may be deformed by the pressure of the scraping member. The lowering can with advantage be controlled by an impulse from this resistance reaction, e.g. the torque of a rotating scraper, but in practice it is often more advantageous to let the lowering take place successively or in steps in accordance with a predetermined schedule, and to furnish the scraper with a torque detector, which suitably automatically disconnects the driving force when the maximum allowed scraper resistance reaction is reached. Controlling devices for these purposes are available on the market.

The agitator may be designed to comprise carriers provided with downwardly extending, preferably obliquely positioned pins or fingers so that it operates effectively as an agitator and scraper, but it may also, with advantage, be provided with one or more, e.g., three, propeller-like arms, arranged to sweep over the whole cross section of the container. It is also possible to make an arrangement with arms provided with more or less elastic bristles on the lower side. When the agitator or the scraper slowly sinks down in the precipitate, dry powder, heated by radiation elements, is brought down against the lower moist layers, which are thus dried. The agitator or the scraper moves all the time in dry or in practically dry powder without risk of mechanically grinding or crushing any comparatively loose aggregates. By suitable inclination or curvature of the material feeding members of the agitator, for instance arranged in such a way that two opposite arms together have a slightly S-bent form in plan, feeding in radial direction, spreading and feeding out (for instance at the centre) during the tapping of the ready dried material can be achieved.

The invention will now be described with reference to a device for its performance, illustrated diagrammatically on the accompanying drawing.

FIGURE 1 is an elevation, partly in section, of the apparatus.

FIGURE 2 is a cross sectional view of the agitator.

From a container 2 furnished with an agitator 1 a slurry is supplied to the drying pan 5 either through a door 4 or through a pipe line 6 equipped with a valve or a measuring or feeding wheel 3. The drying pan 5 has an agitator, consisting of arms 7 which are furnished with a sharp, edge-shaped front and are fastened to a central shaft 8, connected with a motor 10, suitably capable of working at two speeds, and a hoisting and lowering equipment 11. The pan has in its bottom a steam-jacket 15 with an inlet 16 for steam and an outlet 17 for condensate. At a safe height above the space designed for goods preferably electrical radiators 20 are arranged through studs 21. Above the space for the slurry an air- or gas-pipe 23 is inserted into the pan through the stud 22, for instance to be used for supplemental drying in an end phase. At the top of the container there is a gas outlet 25 connected to a gas pipe 26, which in the case shown, leads to the upper part of the container 2 via a cooler 27 for recovering powder possibly entrained with the gas stream.

A torque sensor-transmitter 38 is arranged on shaft 8 and gives, via a connection 12 an impulse to the motor 10 and/or the hoisting and lowering device 11.

At a lower part of the bottom of the drying pan 5 an outlet 30 is arranged for the powder. This outlet is connected with a collecting container 32 through a pipe 31, which container should be equipped in a known way, with a valve for dustfree tapping.

In case it is desired to work in vacuum the outlet 25 is connected with a vacuum equipment 40 through the pipe 26 and the pipe 35 connected thereto by shutting valve 34 of pipe 26 and opening valve 36 of pipe 35.

It is to be understood that the removal of powder from the pan can take place pneumatically, e.g., by a sucking pipe or hose inserted into the pan, as from above.

We claim:

1. A method for drying particulate matter which is moist with an evaporatable liquid, particularly temperature sensitive matter and porous matter easily damaged by mechanical pressure or stress, in a drying pan having a substantially horizontal bottom sloping to the horizontal not more than about 45°, comprising establishing a cake of said matter on the bottom of the pan, supplying heat to said cake of matter from above, moving a member along the upper surface of said cake in such contact therewith as to loosen therefrom superficial particles only by feeding said member gradually in short steps, downwards through said cake to form from the particles a loosened free flowing powder, and removing said powder from the pan.

2. A method as claimed in claim 1, in which said cake is formed by supplying a slurry of said particulate matter in a liquid to said pan, evaporating a portion of said liquid by supplying heat to said slurry and removing vapors therefrom while stirring the slurry by moving said member within the slurry, removing said member from within said slurry when the mechanical resistance reaction from the concentrated slurry against the motion of said member suddenly and markedly increases, and completing the drying as stated in claim 1.

3. A method as claimed in claim 1 in which said member is fed downwards into said cake of matter as long as the resistance reaction against said member from said cake is below a predetermined value defined by the strength of the individual particles of said particulate matter so as substantially to avoid damage thereof.

4. An apparatus for drying a cake of particulate matter which is moist with an evaporatable liquid comprising a pan having a substantially horizontal bottom sloping to the horizontal not more than 45°, a cake space in the bottom portion of said pan for receiving such cake; at least one heating element above said cake space; a member arranged to move repeatedly in the space above said bottom substantially in parallel thereto and means for moving said member from an upper position above said cake space gradually through said cake space towards said bottom.

5. An apparatus as claimed in claim 4 in which said pan is circular and said member is arranged to rotate about the central axis of said circular pan.

6. An apparatus as claimed in claim 4 in which the edge of said member is arranged parallel to said bottom and comprising means for moving said member at adjustable speed substantially parallel to and successively from above substantially into contact with said bottom.

7. An apparatus as claimed in claim 4 comprising means for moving said member, said means alternatingly moving said member periodically in said cake space and lifting it from said cake space and to act alternatively as a mechanical stirring member and as a scraping member.

8. An apparatus as claimed in claim 4 comprising a steam jacket connected to said bottom of the pan.

9. An apparatus as claimed in claim 4 in which the lower edge of said member is sharp on the frontside in the direction of movement thereof.

10. An apparatus as defined in claim 4 comprising an impulse member connected to automatically lower said member responsive to the resistance reaction set up against said member by such cake.

11. An apparatus as defined in claim 4, comprising an impulse member connected to automatically raise said member responsive to a resistance reaction set up against it by a thickening slurry undergoing evaporative heating in said cake space.

References Cited

UNITED STATES PATENTS

| 1,779,571 | 10/1930 | Ullgren | 259—108 X |
| 2,325,573 | 7/1943 | Thompson et al. | 127—28 |
| 2,755,853 | 7/1956 | Edgett et al. | 159—25 |
| 3,295,835 | 1/1967 | Klopper | 259—108 |

FOREIGN PATENTS

| 781,334 | 8/1957 | Great Britain. |
| 977,742 | 4/1951 | France. |
| 33,530 | 2/1908 | Austria. |

NORMAN YUDKOFF, Primary Examiner

J. SOFER, Assistant Examiner

U.S. Cl. X.R.

23—335, 346; 34—33; 159—25, 47; 209—3, 11; 264—.5